(12) United States Patent
Gajewski

(10) Patent No.: US 8,042,507 B2
(45) Date of Patent: *Oct. 25, 2011

(54) NON-CIRCULAR ROTARY COMPONENT

(75) Inventor: Witold Gajewski, Richmond Hill (CA)

(73) Assignee: Litens Automotive Partnership, Woodbrige (CA)

( * ) Notice: Subject to any disclaimer, the term of this patent is extended or adjusted under 35 U.S.C. 154(b) by 180 days.

This patent is subject to a terminal disclaimer.

(21) Appl. No.: 12/315,962

(22) Filed: Dec. 8, 2008

(65) Prior Publication Data

US 2009/0149287 A1 Jun. 11, 2009

Related U.S. Application Data

(63) Continuation of application No. 10/571,737, filed as application No. PCT/CA2004/001642 on Sep. 20, 2004, now Pat. No. 7,493,880.

(60) Provisional application No. 60/504,570, filed on Sep. 18, 2003.

(51) Int. Cl.
*F01L 1/02* (2006.01)
(52) U.S. Cl. .................. 123/90.31; 123/90.17; 464/160
(58) Field of Classification Search ............... 123/90.15, 123/90.17, 90.31, 31, 90.27; 464/1, 2, 160
See application file for complete search history.

(56) References Cited

U.S. PATENT DOCUMENTS

| | | | |
|---|---|---|---|
| 4,756,203 A | 7/1988 | Matsuda et al. | |
| 4,974,470 A | 12/1990 | Ishikawa et al. | |
| 5,417,186 A | 5/1995 | Elrod et al. | |
| 6,776,067 B2 | 8/2004 | Bogelein et al. | |
| 7,044,875 B2 | 5/2006 | Gajewski et al. | |
| 7,232,391 B2 | 6/2007 | Gajewski et al. | |
| 7,493,880 B2 * | 2/2009 | Gajewski | 123/90.31 |

FOREIGN PATENT DOCUMENTS

| | | |
|---|---|---|
| CA | 2401806 | 9/2001 |
| DE | 19520508 | 12/1996 |
| JP | 63106453 | 5/1988 |

* cited by examiner

*Primary Examiner* — Ching Chang
(74) *Attorney, Agent, or Firm* — Harness, Dickey & Pierce, P.L.C.

(57) ABSTRACT

A rotary component with a rotor having a plurality of teeth arranged around the perimeter of the rotor. Each tooth has a crown and each pair of adjacent teeth has a valley therebetween. The crowns of the teeth lie on a curved envelope forming the perimeter of the rotor. The perimeter of the rotor has a non-circular profile with at least two protruding portions alternating with receding portions, in which the distance between the midpoints of the crowns of each pair of adjacent teeth is substantially the same, the profile of the valley between each pair of adjacent teeth is substantially the same, and the distance between the midpoint of each crown and the axis of the rotor varies around the perimeter to produce the said non-circular profile.

11 Claims, 10 Drawing Sheets

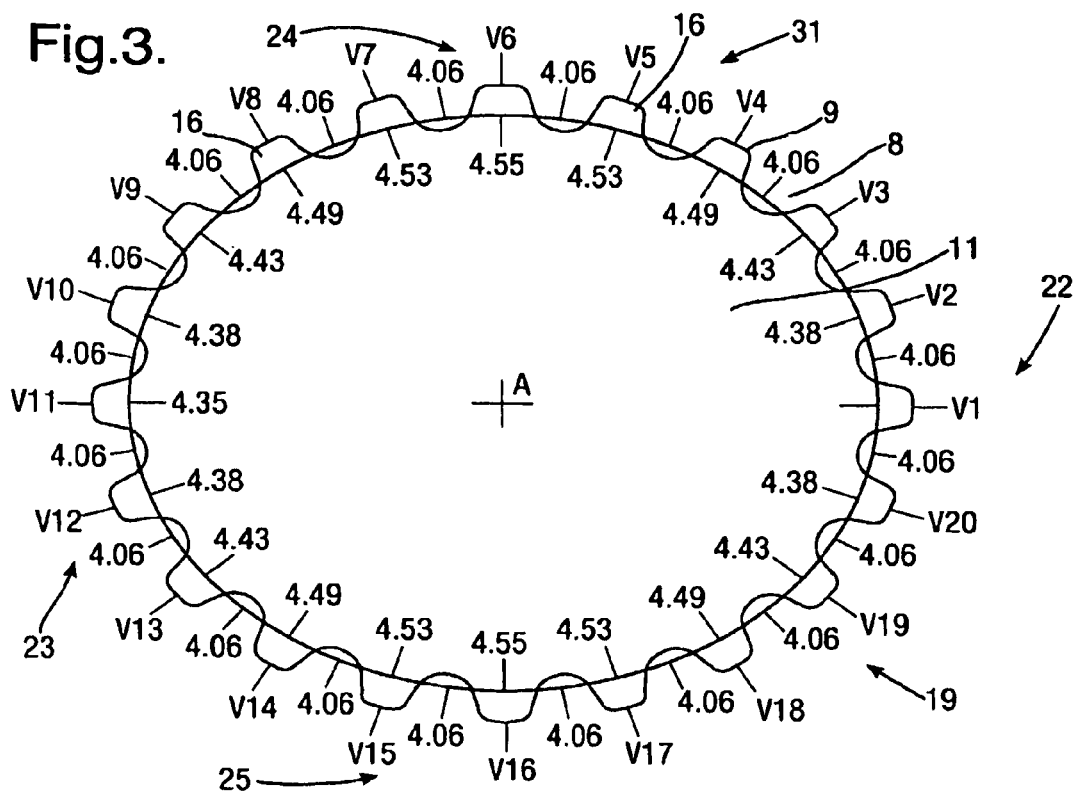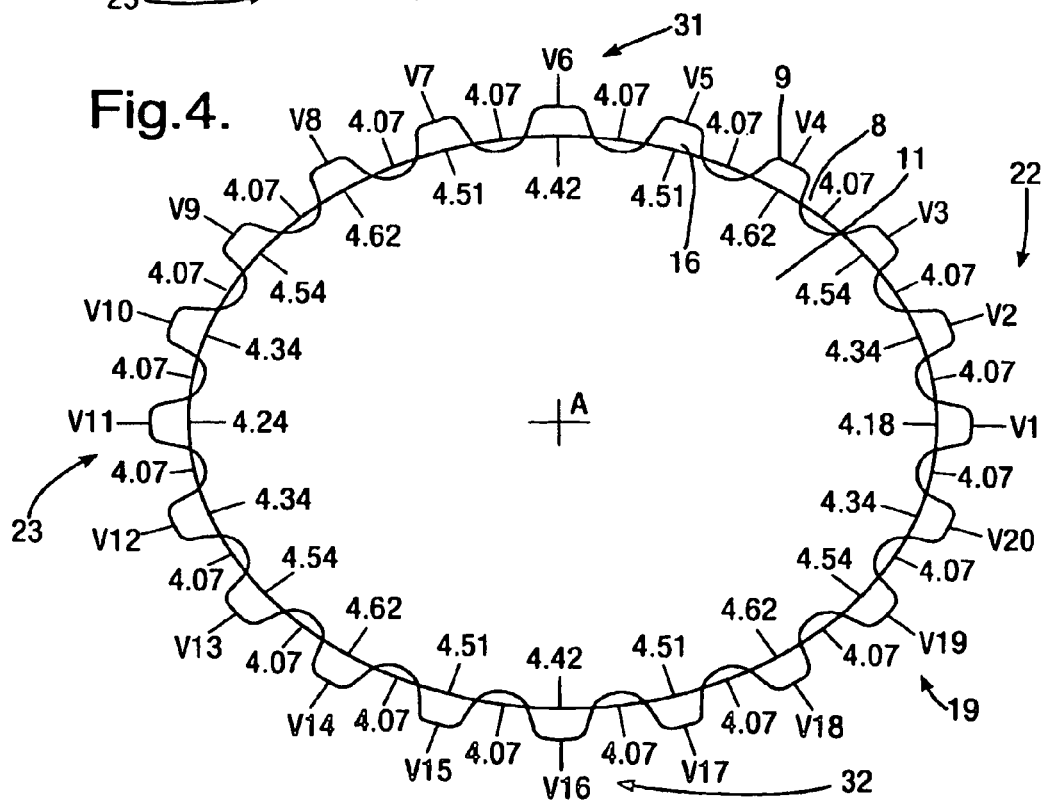

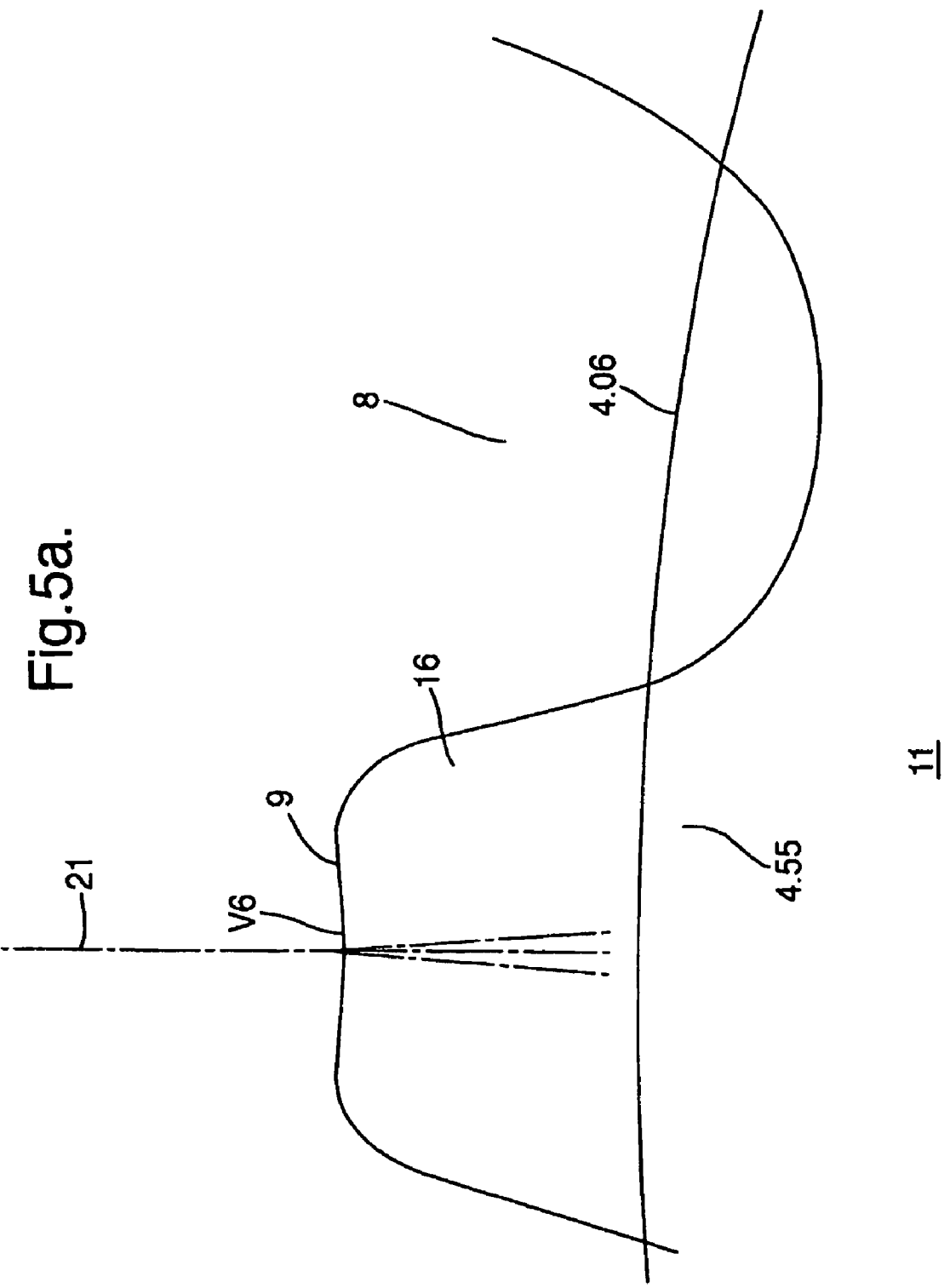

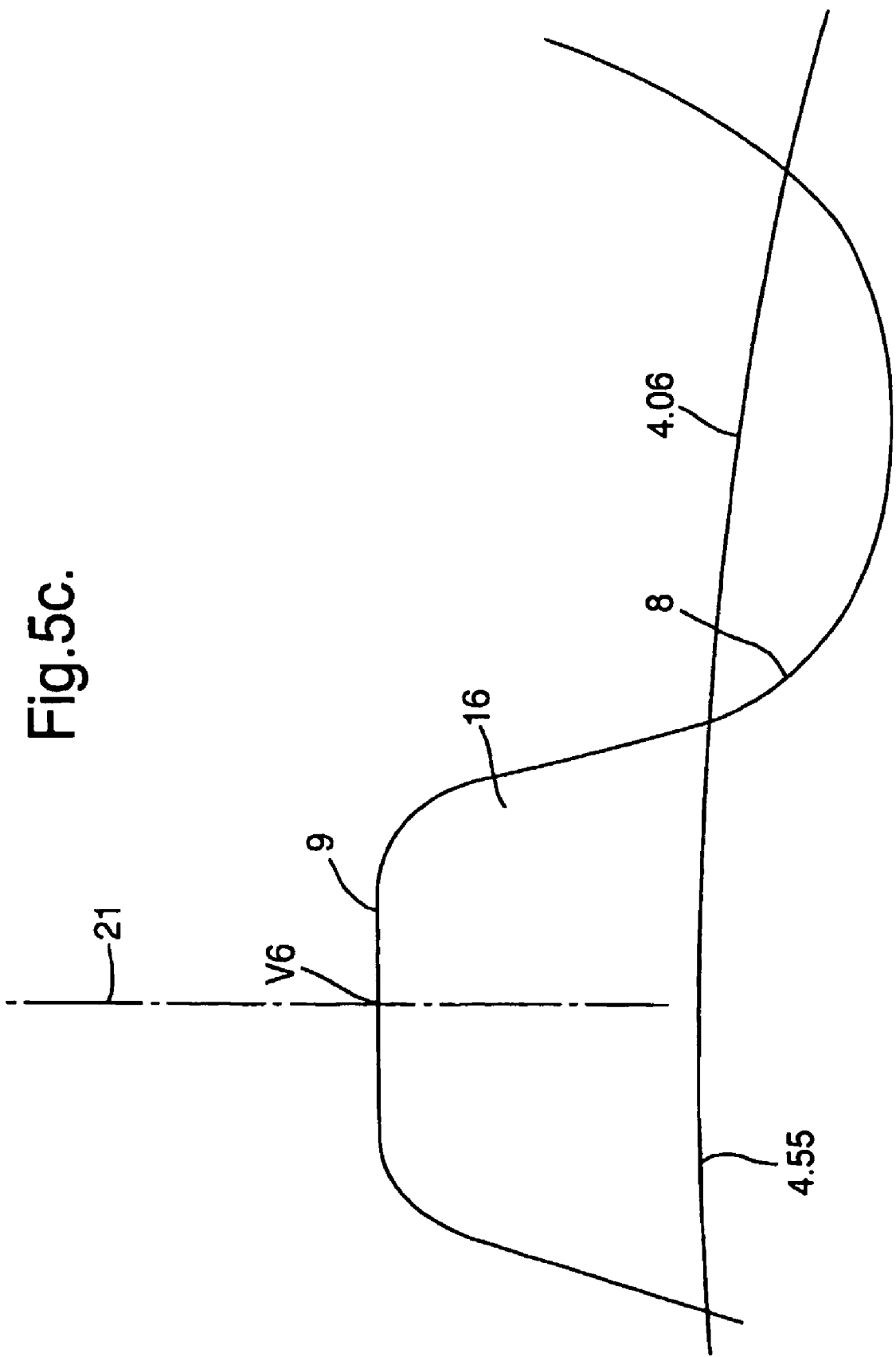

4-cylinder inline
crankshaft: oval
camshaft: round 4-cylinder inline
crankshaft: round
camshaft: square 4-cylinder inline
crankshaft: oval
camshaft: square 3-cylinder inline
crankshaft: round
camshaft: triangular 6-cylinder inline
crankshaft: triangular
camshaft: round 6-cylinder V6
crankshaft: round
camshaft: triangular 8-cylinder V8
crankshaft: round
camshaft: square 2-cylinder
crankshaft: round
camshaft: oval

NON-CIRCULAR ROTARY COMPONENT

This application is a continuation of U.S. patent application Ser. No. 10/571,737, which was filed on Mar. 14, 2006 (now U.S. Pat. No. 7,493,880), which is a national phase application of International Application No. PCT/CA2004/001642 filed Sep. 20, 2004, which claims the benefit of U.S. Provisional Patent Application Ser. No. 60/504,570 filed Sep. 18, 2003. The disclosures of the aforementioned patent applications are hereby incorporated by reference as if fully set forth in its/their entirety herein.

The present invention relates to a non-circular rotary component in particular but not exclusively for a synchronous drive apparatus, and to a method of constructing such a component. The component may comprise a non-circular sprocket component which may be used for the elimination or reduction of mechanical vibrations, in particular but not exclusively in internal combustion engines.

BACKGROUND OF INVENTION

Synchronous drive systems, such as timing belt based systems, are widely used in motor vehicles, as well as in industrial applications. In motor vehicles, for example, timing belts or chains are used to drive the camshafts that open and close the engine intake and exhaust valves. Also other devices such as water pumps, fuel pumps etc. can be driven by the same belt or chain.

Internal combustion engines produce many types of mechanical vibrations during their operation, and these vibrations are usually transmitted through the timing belt or chain in the synchronous drive system. A particularly intense source of mechanical vibrations is given by the intake and exhaust valves and the camshafts that open and close those intake and exhaust valves. Opening and closing the intake and exhaust valves leads to a type of vibration known as torsional vibration. When the frequency of these vibrations is close to the natural frequency of the drive, system resonance occurs. In resonance the torsional vibrations and the span tension fluctuations are at their maximum.

Torsional vibrations cause fluctuations in belt or chain tension, which can lead to increased wear and reduced belt or chain life. Torsional vibrations may also cause timing errors, and result in undesirable amounts of noise.

It is known to provide non-circular sprocket components in such drive systems to attempt to reduce or eliminate vibration. In DE-A-195 20 508 (Audi AG), there is disclosed a wrapped belt drive for an internal combustion engine, the timing belt being wrapped around two driven pulleys coupled to the camshaft of the engine, and one drive pulley coupled to the crankshaft of the engine. It is proposed in the citation to reduce torsional vibrations by an "out of round" pulley, which is shown as consisting of one of the camshaft pulleys. The out of round pulley which is shown has four protruding portions and four receding portions arranged regularly around the pulley.

In Japanese Utility Model JP 62-192077 (Patent Bulletin No. HEI 1-95538) of 1987 (Hatano et al/Mitsubishi), there is disclosed a tension equalising driving device which transmits the rotation of a drive pulley to a driven pulley by a belt drive such as a timing belt in an internal combustion engine. There is shown a timing belt arrangement in which a toothed pulley of the drive shaft of a camshaft is driven by an oval timing belt driving sprocket connected to the drive shaft of an internal combustion engine. In Japanese Application No. HEI 9-73581 (Patent Bulletin No. HEI 10-266868) of 1997 (Kubo/Mitsubishi) reference is also made to the use of an oval sprocket as a crank sprocket.

SUMMARY OF INVENTION

In accordance with the present invention in a first aspect there is provided a rotary component comprising a rotor having a plurality of teeth arranged around the perimeter of the rotor, each tooth having a crown, and each pair of adjacent teeth having a valley therebetween, the crowns of the teeth lying on a curved envelope forming the perimeter of the rotor, the perimeter of the rotor having a non-circular profile having at least two protruding portions alternating with receding portions, in which the distance between the midpoints of the crowns of each pair of adjacent teeth is substantially the same, the profile of the valley between each pair of adjacent teeth is substantially the same, and the distance between the midpoint of each crown and the axis of the rotor varies around the perimeter to produce the said non-circular profile.

In accordance with the present invention in a second aspect there is provided a rotary component comprising a rotor having a plurality of teeth arranged around the perimeter of the rotor, each tooth having a crown, and each pair of adjacent teeth having a valley therebetween, the crowns of the teeth lying on a curved envelope forming the perimeter of the rotor, the perimeter of the rotor having a non-circular profile having at least two protruding portions alternating with receding portions, in which for each tooth the orientation of the valley on one side of the tooth relative to the valley on the other side of the tooth taken about the midpoint of the crown of the tooth varies around the perimeter to produce the said non-circular profile.

In accordance with the present invention in a third aspect there is provided a rotary component comprising a rotor having a plurality of teeth arranged around the perimeter of the rotor, each tooth having a crown, and each pair of adjacent teeth having a valley therebetween, the crowns of the teeth lying on a curved envelope forming the perimeter of the rotor, the perimeter of the rotor having a non-circular profile having at least two protruding portions alternating with receding portions, in which the midpoints of the crowns of the teeth are positioned respectively at intersections of adjacent sides of a non-regular polygon with equal sides arranged in a non-circular configuration, the position of an intersection $V_n$ of two adjacent sides of the polygon being given by the formula:

$$R_n = L + B\cos\left(2\pi \frac{n}{N} M\right)$$

where:
$R_n$ = distance from an intersection $V_n$ to the centre A of the rotor,
n = the number of the intersection $V_n$, numbered from a reference intersection at n=1,
L = the average distance from an intersection $V_n$ to the centre A of the rotor,
B = the desired out-of-round factor defined as the difference between the average distance L and the actual distance $R_n$ when taken either at the greatest value of $R_n$ or at the least value of $R_n$,
N = the number of teeth required on the rotor, and
M = the number of protruding portions of the rotor profile.

Although, in all aspects, the invention has application In many forms of apparatus where a non-circular rotary component is required, the invention finds particular application in a synchronous drive apparatus comprising: a continuous-loop elongate drive structure having a plurality of engaging sections; a plurality of rotors comprising at least a first and a second rotor, the first rotor having a plurality of teeth for engaging the engaging sections of the elongate drive structure, and the second rotor having a plurality of teeth for engaging the engaging section of the elongate drive structure; a rotary load assembly coupled to the second rotor; the elongate drive structure being engaged about the first and second rotors, the first rotor being arranged to drive the elongate drive structure and the second rotor being arranged to be driven by the elongate drive structure, the rotary load assembly being such as to present a periodic fluctuating load torque when driven in rotation. In such an apparatus, one of the said first and second rotors is a non-circular rotary component according to the invention as set out above and arranged to reduce or substantially cancel vibration arising from the fluctuating load torque of the rotary load assembly.

It is to be appreciated that the invention finds application In many forms of synchronous drive apparatus other than In internal combustion engines and indeed in apparatus other than synchronous drive apparatus. Also, the non-circular profile may be provided In many different locations within the drive apparatus. For example a non-circular profile may be provided on the first rotor (which drives the elongate drive structure), and/or on the second rotor (which is driven by the elongate drive structure), and/or may be provided on a third rotor, for example an idler rotor urged into contact with the continuous loop elongate drive structure.

However, an embodiment of the invention finds particular use when installed in an Internal combustion engine and when the first rotor comprises a crankshaft sprocket. In some arrangements the internal combustion engine is a diesel engine, and the rotary load assembly comprises a rotary fuel pump. In other arrangements, the Internal combustion engine may be a petrol or gasoline engine and the rotary load assembly may be a camshaft assembly.

It will be appreciated that many different forms of non-circular profile may be provided, for example a generally oval profile, or a profile having three or four protruding portions arranged regularly around the rotor. The choice of profile will depend upon other components of the synchronous drive apparatus. Examples which may be provided include the following, namely: the internal combustion engine is a 4-cylinder inline combustion engine and the crankshaft sprocket has an oval contoured profile; the internal combustion engine is a 4-cylinder inline combustion engine and the camshaft sprocket has a generally rectangular contoured profile; the internal combustion engine is a 4-cylinder inline combustion engine, and the camshaft sprocket has a generally rectangular contoured profile and the crankshaft sprocket has an oval contoured profile; the internal combustion engine is a 3-cylinder inline combustion engine and the camshaft sprocket has a generally triangular contoured profile; the internal combustion engine is a 6-cylinder Inline combustion engine and the crankshaft sprocket has a generally triangular contoured profile; the internal combustion engine is a 6-cylinder V6 combustion engine and the camshaft sprocket has a generally triangular contoured profile; the internal combustion engine is an 8-cylinder V8 combustion engine and the camshaft sprocket has a generally rectangular contoured profile; or the internal combustion engine is a 2-cylinder combustion engine and the camshaft sprocket has an oval contoured profile.

In most embodiments of the invention as set out above, the protruding portions and receding portions will be generally of the same magnitude, giving a regular non-circular profile. However depending upon the circumstances a non-regular profile may be provided. Furthermore, the protruding portions referred to above may constitute major protruding portions and the receding portions constitute major receding portions, and the non-circular profile may include additional minor protruding portions of lesser extent than the major protruding portions. These minor protruding portions may be adapted for the purpose of reducing or substantially cancelling vibration from subsidiary order fluctuating load torque presented by the rotary load assembly, in particular for example from fourth order fluctuating load torques presented by the rotary load assembly.

In one particularly useful form of the invention, there is provided a synchronous drive apparatus as previously set out, and having the following features, namely that the said protruding portions constitute major protruding portions and the said receding portions constitute major receding portions, and the non-circular profile includes additional minor protruding portions of lesser extent than the major protruding portions; the said non-circular rotary component having the midpoints of the crowns of the teeth positioned respectively at intersections of adjacent sides of a non-regular polygon with equal sides arranged In a non-circular configuration, the position of an intersection $V_n$ of two adjacent sides of the polygon being given by the formula:

$$R_n = L + B_2 \cos\left(2\pi \frac{n}{N} 2\right) + B_4 \cos\left(2\pi \frac{n}{N} 4 + \varphi\right)$$

where:
$R_n$=distance from an intersection $V_n$ to the centre A of the rotor,
n=the number of the intersection $V_n$, numbered from a reference intersection at n=1,
L=the average distance from an intersection $V_n$ to the centre A of the rotor,
$B_2$=a first desired out-of-round factor defined as the difference between the average distance L and the actual distance $R_n$ when taken either at the greatest value of $R_n$ at a major protruding portion or at the least value of $R_n$ at a major receding portion, the first out-of-round factor being such as to reduce or eliminate vibration arising from 2nd order harmonics of the rotary load assembly,
$B_4$=a second desired out-of-round factor defined as the difference between the average distance L and the actual distance $R_n$ when taken either at the greatest value of $R_n$ at a minor protruding portion or at the least value of $R_n$ at a minor receding portion, the second out-of-round factor being such as to reduce or eliminate vibration arising from 4th order harmonics of the rotary load assembly,
N=the number of teeth required on the rotor, and
$\phi$=an angle representing a desired phase shift between 2nd and 4th order vibrations.

It is to be appreciated that where features of the invention are set out herein with regard to apparatus according to the invention, such features may also be provided with regard to a method according to the invention of constructing a non-circular rotary component and vice versa.

In particular, there is provided In accordance with another aspect of the invention a method of constructing a rotary component comprising a rotor having a plurality of teeth arranged around the perimeter of the rotor, each tooth having a crown, and each pair of adjacent teeth having a valley therebetween, the crowns of the teeth lying on a curved envelope forming the perimeter of the rotor, the perimeter of the rotor having a non-circular profile having at least two protruding portions alternating with receding portions; the method comprising the steps of:

generating a template of a non-regular polygon with equal sides arranged in a non-circular configuration, the position of an intersection $V_n$ of two adjacent sides of the polygon being given by the first formula set out hereinbefore;

generating an outline of the teeth to be positioned around the perimeter of the rotor by positioning the centre points of the crowns of the teeth at the points of intersection of the sides of the non-regular polygon;

and constructing the rotary component to have an outer perimeter corresponding to the outline of the teeth generated by reference to the non-regular polygon.

In accordance with yet another aspect of the invention, there may be provided a method of constructing a rotary component comprising a rotor having a plurality of teeth arranged around the perimeter of the rotor, each tooth having a crown, and each pair of adjacent teeth having a valley therebetween, the crowns of the teeth lying on a curved envelope forming the perimeter of the rotor, the perimeter of the rotor having a non-circular profile having at least two major protruding portions alternating with major receding portions, and the non-circular profile includes additional minor protruding portions and minor receding portions of lesser extent than the major protruding portions and major receding portions, the method comprising the steps of:

generating a template of a non-regular polygon with equal sides arranged in a non-circular configuration, the position of an intersection $V_n$ of two adjacent sides of the polygon being given by the second formula set out hereinbefore;

generating an outline of the teeth to be positioned around the perimeter of the rotor by positioning the centre points of the crowns of the teeth at the points of intersection of the sides of the non-regular polygon; and constructing the rotary component to have an outer perimeter corresponding to the outline of the teeth generated by reference to the non-regular polygon.

A number of advantages arise in application of the invention, at least in preferred embodiments of the invention. The importance of keeping the valley shape constant on the rotary component is that it allows better mating with the teeth of the drive belt. The belt and the sprocket have to match each other as perfectly as possible for performance and durability. Belt manufacturers have endeavoured for years to design exacting shapes for a belt tooth profile and matching sprocket tooth profile. Creating equivalent conditions on non-circular sprockets generates a challenge. Specific formulas are provided to deliver a design solution providing geometric directives of how the sprocket teeth have to be constructed, positioned and oriented. The main feature, in preferred embodiments, is that the valley width is kept substantially constant while the tooth width varies. However, there are additional preferred features. For a non-circular sprocket to act efficiently in cancelling vibrations of a particular order, the distance of the teeth from the sprocket center, and the teeth orientation, play important roles.

DESCRIPTION OF THE DRAWINGS

Embodiments of the invention will now be described by way of example with reference to the accompanying drawings in which:

FIG. 3 is another view of the diagrammatic representation of the non-circular sprocket component of FIG. 1, illustrating dimensions of various parts of the sprocket component;

FIG. 4 is a schematic representation of another non-circular sprocket component embodying the invention, again illustrating dimensions of various portions of the sprocket component, the sprocket component having a profile which is generally oval, but modified to include additional minor protruding portions to give a generally rectangular formation;

FIGS. 5a and 5b show greatly enlarged schematic views of teeth of the sprocket component shown in FIG. 5 in one exemplary form, and FIGS. 5c and 5d show similar enlarged schematic illustrations of the corresponding teeth, but in another alternative form;

DESCRIPTION OF THE INVENTION

Figure 1:
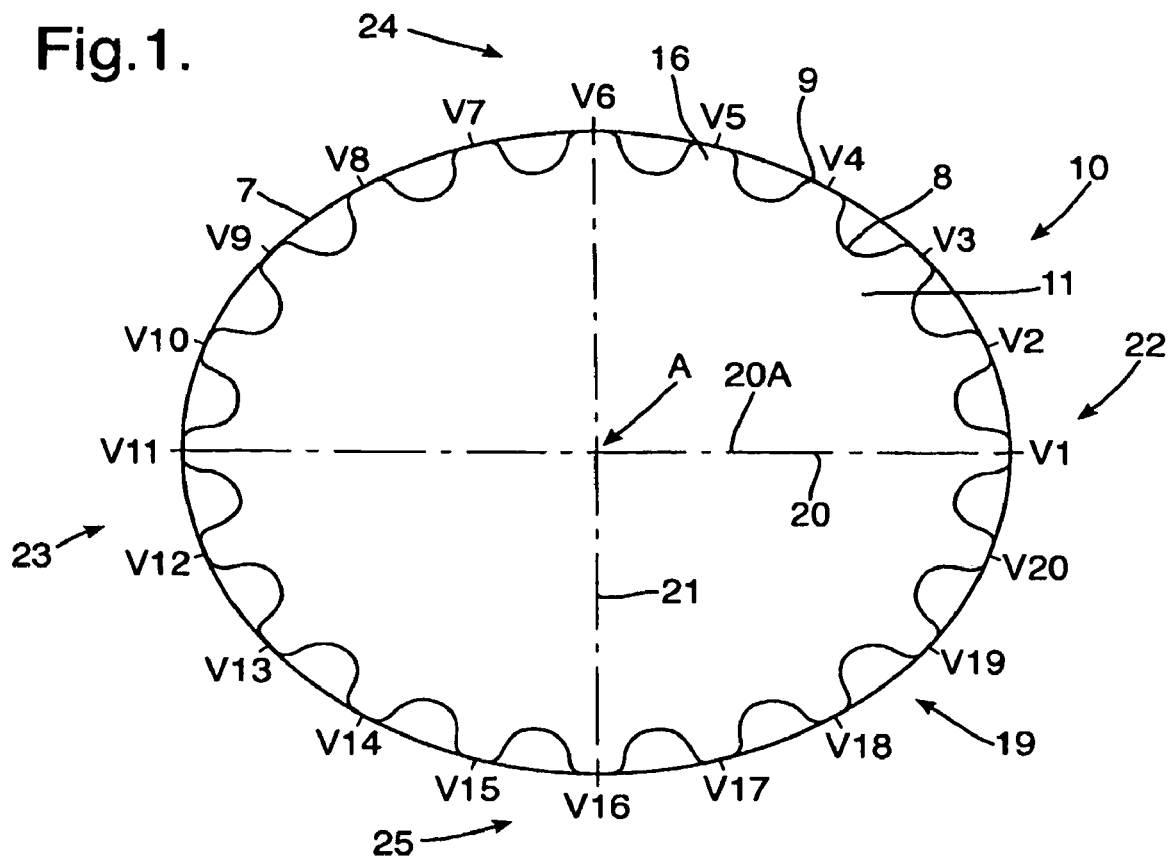
FIG. 1 is a schematic illustration of a non-circular sprocket component embodying the invention, which may be used for example in a motor vehicle internal combustion engine.

FIG. 1 is a schematic illustration of a non-circular sprocket component embodying the invention, which may be used for example in a motor vehicle internal combustion engine. A non-circular sprocket component 10 comprises a rotor 11 having a plurality of teeth 16 arranged around the perimeter of the rotor, each tooth having a crown 9 and each pair of adjacent teeth having a valley 8 therebetween. The crowns of the teeth lie on a curved envelope 7 forming the perimeter of the rotor, the perimeter of the rotor having a non-circular profile having two protruding portions 22 and 23 and two receding portions 24 and 25. The rotor 11 has an axis A about which the rotor is rotated in operation. The midpoint of each crown 9 of each tooth 16 is indicated by the reference letter V, each midpoint being labelled individually as V1, V2, V3 and so on up to V20.

It is known to construct a sprocket component having a non-circular profile. The present invention is concerned with the manner of arrangement of the teeth around the perimeter, and the configuration of the teeth, so as to achieve the required non-circular profile in a particularly advantageous manner. In the exemplary embodiment shown in FIG. 1, which combines a number of preferred features, it is arranged that the distance between the midpoints V of the crowns 9 of each pair of adjacent teeth is substantially the same. The profile of the valley 8 between each pair of adjacent teeth is also substantially the same. The distance between the midpoint V of each crown 9 and the axis A of the rotor 11, varies around the perimeter of the rotor to produce the required non-circular profile. In accordance with the preferred features combined in FIG. 1, for each tooth 16 the orientation of the valley 8 on one side of a tooth relative to the valley 8 on the other side of the tooth, taken about the midpoint V of the crown of the tooth, varies around the perimeter to produce the said non-circular profile. This is illustrated more fully in the detailed FIGS. 5a to 5d, to be described hereinafter.

Figure 2:
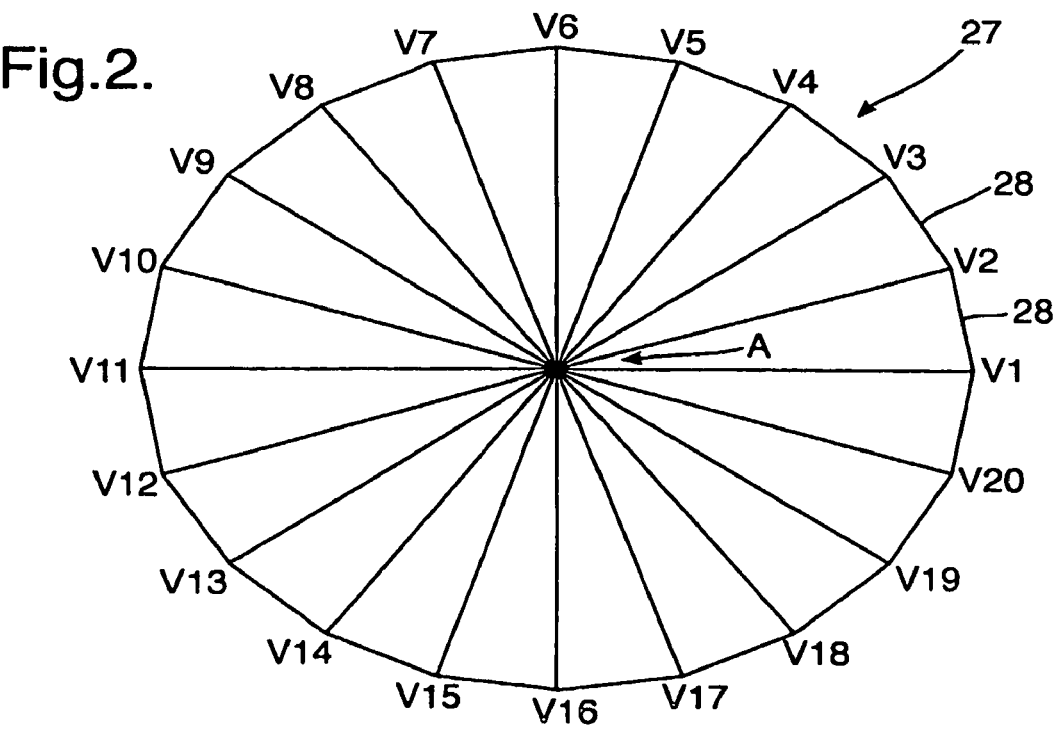
FIG. 2 is a schematic illustration of a non-circular polygon template used in a method embodying the Invention for constructing a non-circular sprocket component.

Also, in relation to the preferred features embodied in FIG. 1, the midpoints V of the crowns 9 of the teeth are positioned respectively at intersections of adjacent sides of a non-regular polygon 27 shown in FIG. 2, having equal sides 28 arranged in a non-circular configuration, in this case in a generally oval configuration. The position of an intersection V1 or V2 or V3 (referred to generally as an intersection $V_n$) of two adjacent sides of the polygon is given by the formula:

$$R_n = L + B\cos\left(2\pi \frac{n}{N} M\right)$$

where:
$R_n$=distance from an intersection $V_n$ to the centre A of the rotor,
n=the number of the intersection $V_n$, numbered from a reference intersection at n=1,
L=the average distance from an intersection $V_n$ to the centre A of the rotor,
B=the desired out-of-round factor defined as the difference between the average distance L and the actual distance $R_n$ when taken either at the greatest value of $R_n$ or at the least value of $R_n$,
N=the number of teeth required on the rotor, and
M=the number of poles, i.e. protruding portions of the rotor profile (for example two for oval, three for triangular, four for square, etc.).

Thus in FIG. 2 the vertices V1 to V20 represent the positions of the midpoints V1 to V20 of the teeth 16 shown in FIG. 1. The distances between the points V1 to V20 are all equal (or substantially equal) but the distances from these points to the centre of the polygon A vary. Hence the points V1 to V20 form a non-regular polygon with all sides equal, but not being inscribed onto a circle.

An example of calculation for a typical non-circular sprocket may be as follows. The formula for distance from an intersection $V_n$ to the centre A of the rotor states:

$$R_n = L + B\cos\left(2\pi \frac{n}{N} M\right)$$

In an example following values may be assumed:
L=30.32 mm (average distance from an Intersection $V_n$ to the centre A)
B=1.2 mm (desired out-of-round factor)
N=20 (number of teeth required on the rotor)
M=2 (the number of protruding portions)
Using these values generates following results:

| | |
|---|---|
| R1 | 31.52 |
| R2 | 31.29 |
| R3 | 30.69 |
| R4 | 29.95 |
| R5 | 29.35 |
| R6 | 29.12 |
| R7 | 29.35 |
| R8 | 29.95 |
| R9 | 30.69 |
| R10 | 31.29 |
| R11 | 31.52 |
| R12 | 31.29 |
| R13 | 30.69 |
| R14 | 29.95 |
| R15 | 29.35 |
| R16 | 29.12 |
| R17 | 29.35 |
| R18 | 29.95 |
| R19 | 30.69 |
| R20 | 31.29 |

It will be noted in the table above that:
R1 and R11 are 1.2 mm larger than L. This represents the long axis of the sprocket in FIG. 1.
R6 and R16 are 1.2 mm shorter than L. This represents the short axis of the sprocket in FIG. 1.

A method of constructing the sprocket component shown in FIG. 1 also embodies the present invention. Such a method may comprise the steps of firstly generating a template in the form of a non-regular polygon as shown in FIG. 2 using the formula given above. Once all the vertices of the polygon are calculated, the desired profile of tooth and valley is placed between points V1 and V2, V2 and V3, and so on. Next there is generated an outline of a valley with adjacent tooth sides. The valleys are then positioned around the perimeter of the rotor by positioning the centre points of the crown tooth crowns at the points of intersection of the sides of the non-regular polygon. The outline of each tooth and valley is provided such that the profile of the valley between each pair of adjacent teeth is substantially the same. The required non-circular profile of the perimeter being obtained by varying the orientation of the valley on one side of a tooth relative to the valley on the other side of the tooth. The sprocket component is then constructed by reference to the outline of the teeth which has been generated by reference to the non-regular polygon.

The method allows the construction of a sprocket in which all valleys have the same width (measured at some particular given depth) but the teeth will have a varying width. This arrangement is illustrated In FIG. 3 where the width of each valley, at some arbitrarily selected depth, is constant at 4.06 mm, whereas the width of each tooth, selected at the same depth, varies between 4.35 mm at V1, to 4.55 mm at V6.

In a particular practical arrangement for using this method, the factors In the equation are arrived at in the following way. For a given requirement for a sprocket component, the number N of teeth, and the average distance L from the axis A to the tooth crown, will be defined by the use envisaged for the sprocket. The desired out-of-round factor B will also be determined by the use envisaged for the sprocket, for example by the form of vibration to be alleviated in use.

The number of protruding portions or poles M will also be determined by the use to which the sprocket is to be put, for example two for an oval profile, three for a triangular profile, four for a square profile, and so on. Where the sprocket component is to be used in an automotive engine, for example, the number of poles has to match the engine configuration. For example two poles (oval) are suitable for the camshaft sprocket of a 4-cylinder inline engine, three poles (triangular) are suitable for the crankshaft sprocket of a 3-cylinder inline engine or as a camshaft sprocket of a 6-cylinder V6 engine.

There will now be described in more detail the manner in which the constant valley profile is positioned relative to the vertices V1 to V20, to achieve the varying tooth width.

Figure 5:
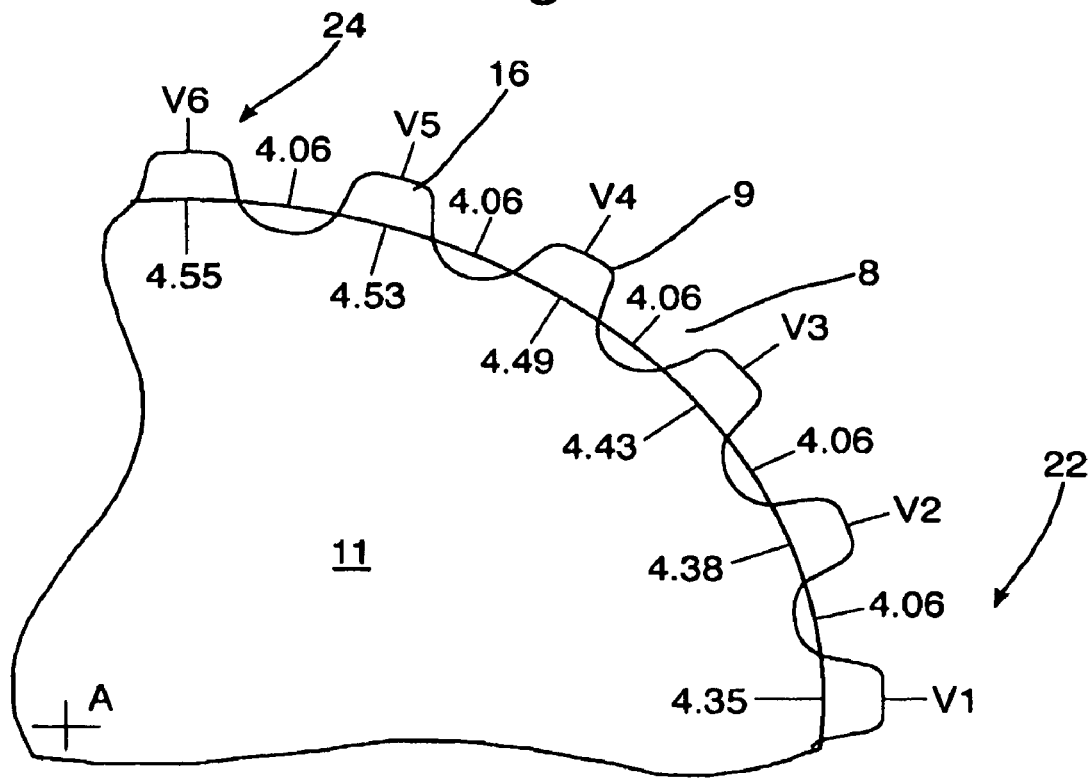
FIG. 5 is an enlargement of part of the perimeter of the sprocket component shown in FIG. 3.
Figure 6:
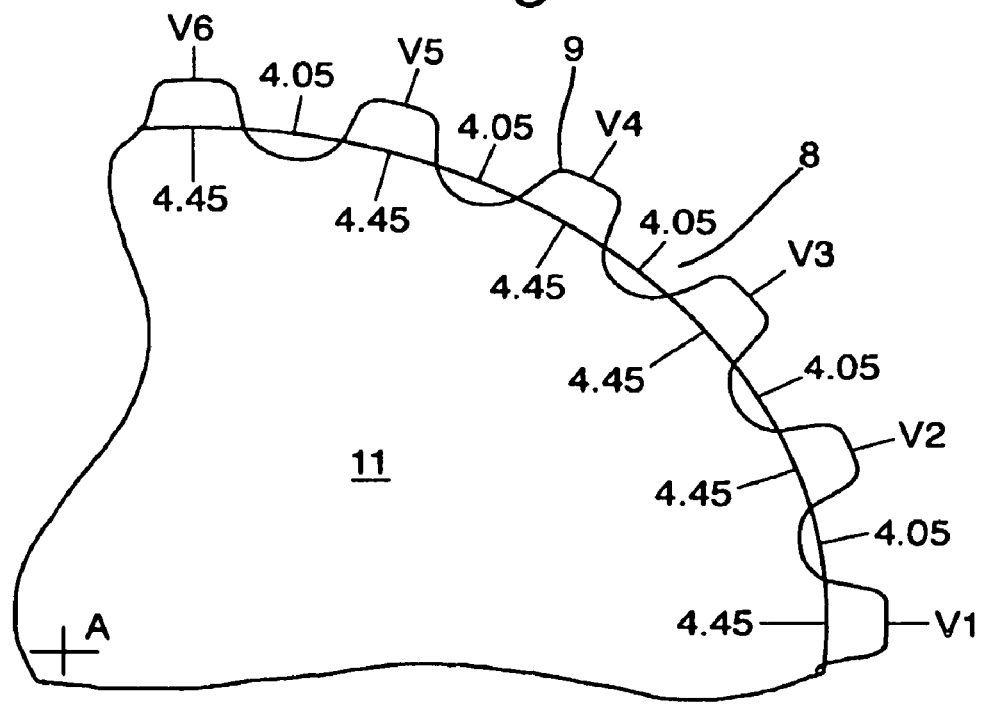
FIG. 6 shows a view similar to FIG. 5 of part of the perimeter of a known, circular, sprocket component, given for comparison purposes.
Figure 5B:
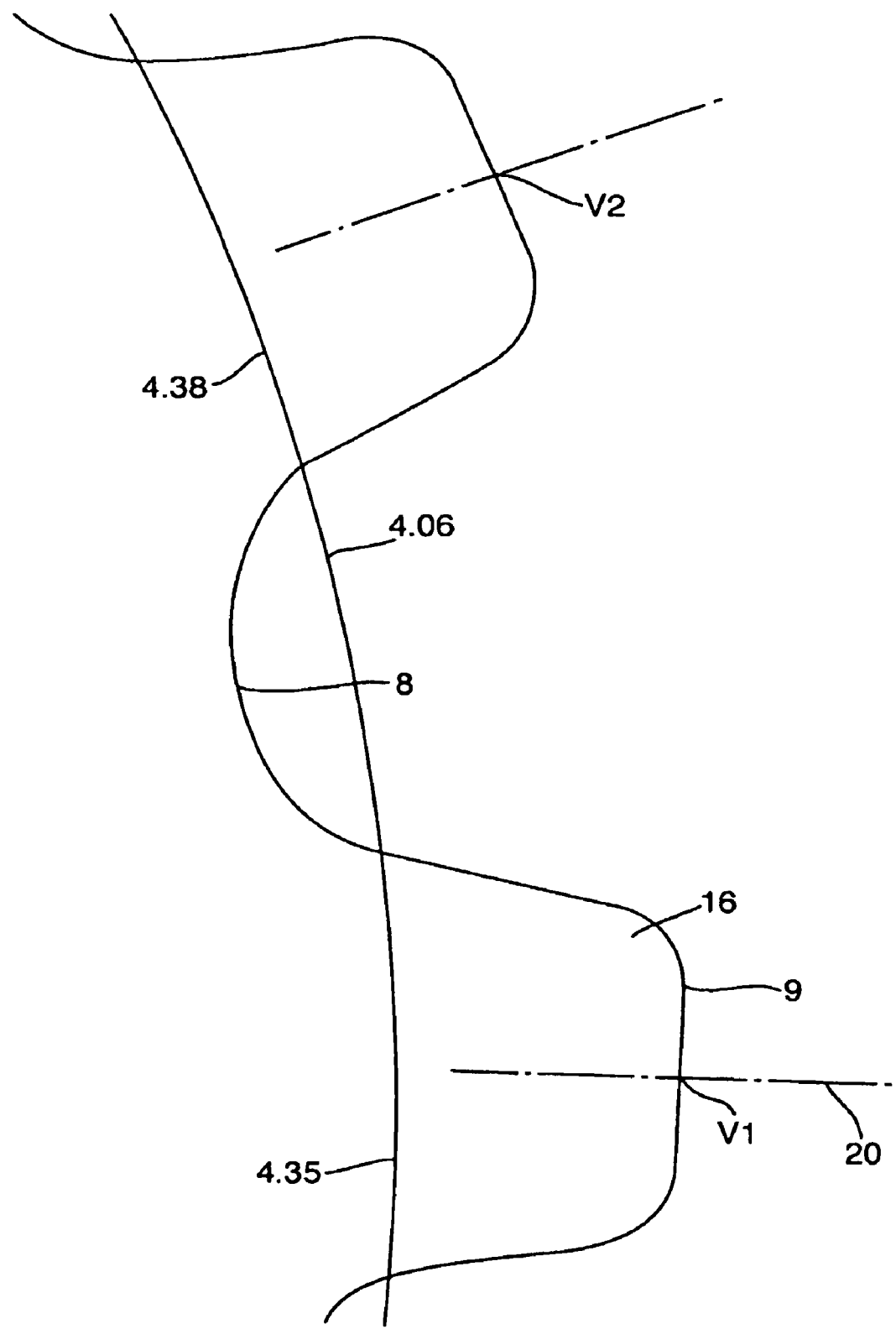
Figure 5D:
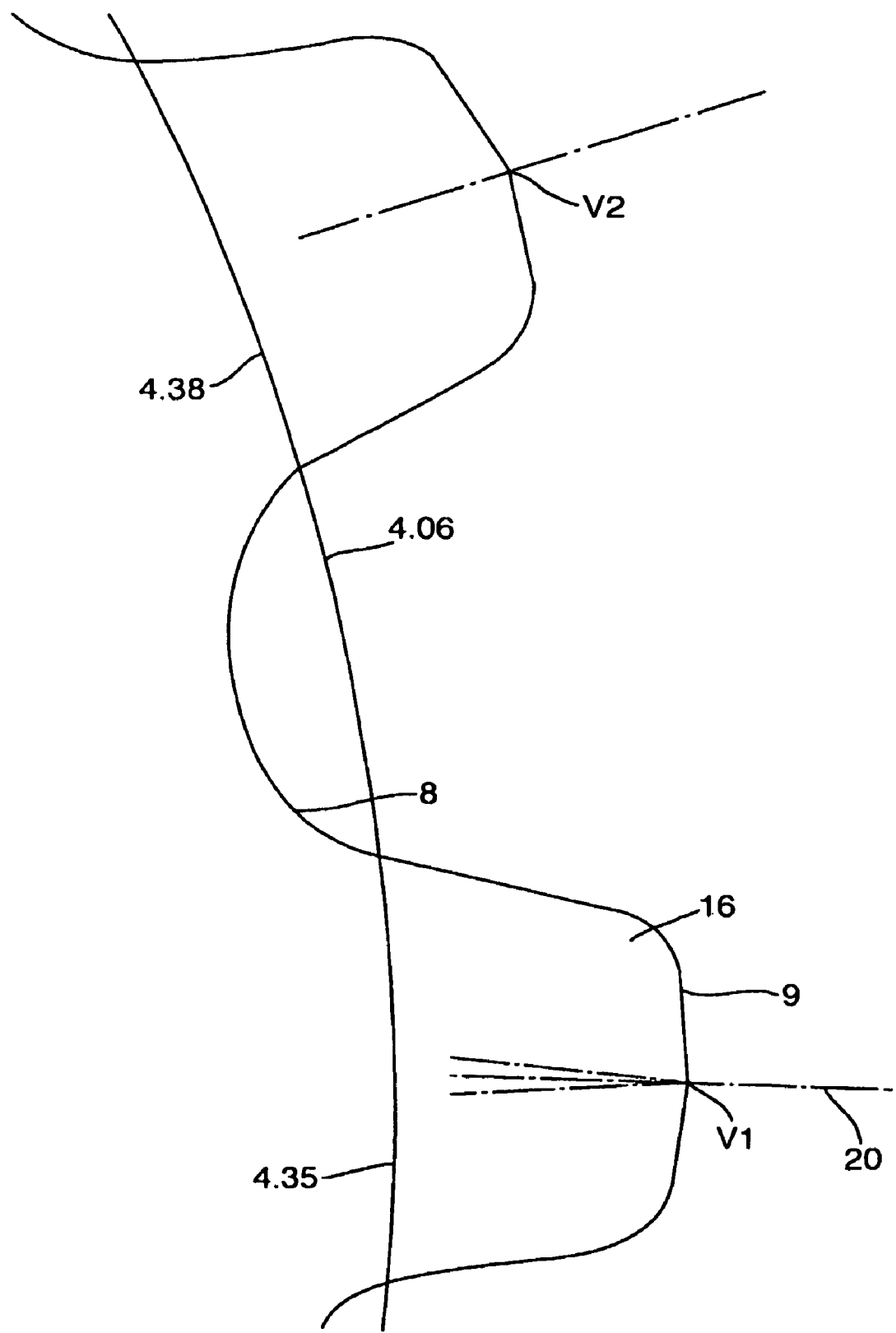

FIG. 5 is an enlargement of part of the perimeter of the sprocket component shown in FIG. 3. FIG. 6 shows a similar view of part of the perimeter of a known, circular, sprocket component, given for comparison purposes. FIGS. 5a and 5b show greatly enlarged schematic views of teeth of the sprocket component shown in FIG. 5, in one exemplary form, and FIGS. 5c and 5d show similar enlarged schematic illustrations of the same teeth, but in another alternative form. In FIG. 5 the width of each tooth at the given depth varies from 4.35 mm to 4.55 mm, while the width of each valley at that depth remains at 4.06 mm. In FIG. 6 it is shown that on a circular sprocket component, the tooth width would remain constant at 4.45 mm and the valley width would remain constant at 4.05 mm.

One particular example of the resulting tooth shapes is given in FIGS. 5a and 5b. In FIG. 5b the crown 9 having the midpoint V1 is shown, merely by way of example, as having a substantially flat crown, shown as a straight line in outline, perpendicular to the diameter 20 of the rotor. In FIG. 5a there is shown in greatly exaggerated form, how the positioning of the constant valley shape produces at the midpoint V6 an indentation in the crown. On either side of the midpoint V6, the flat crown portion 9 is inclined slightly to the diameter 21, with the result that the tooth width is slightly increased to 4.55 mm compared with the tooth width of 4.35 mm in FIG. 5b.

An alternative form of positioning of the constant valley profiles is shown in FIGS. 5c and 5d. Here it is shown, by way of example, that the crown at the midpoint V6 is a flat surface shown by a straight line in the outline of FIG. 5c, substantially perpendicular to the diameter 21. If the construction of the rotor is commenced by arranging that tooth with its midpoint at the point V6 on the polygon of FIG. 2, and the same constant valley shapes are arranged around the profile from V6 to V1, the result at the midpoint V1 is shown in FIG. 5d. Here it is seen that each half portion of the crown 9 on either side of the midpoint V1 is inclined to the diameter 20 at an angle slightly less than 90°, so that there appears a slight cusp or vertex at the midpoint V1.

Thus in each of the two examples shown in FIGS. 5a and 5b and 5c and 5d, the required non-circular profile is obtained by varying the orientation of the valley on one side of a tooth relative to the valley on the other side of the tooth by a variation about the midpoint of the crown of the tooth. It is particularly to be appreciated that the examples described with reference to FIGS. 5a to 5d are merely examples of one form of tooth crown shape which may be provided. In practical examples, the surface of the crown may be rounded or flattened, whilst maintaining the varying orientation of the valleys on either side of the tooth, to achieve the required non-circular profile.

There will now be described with reference to FIGS. 7 to 9d, various examples of synchronous drive apparatus, which may incorporate a non-circular sprocket component embodying the Invention.

Figure 7:
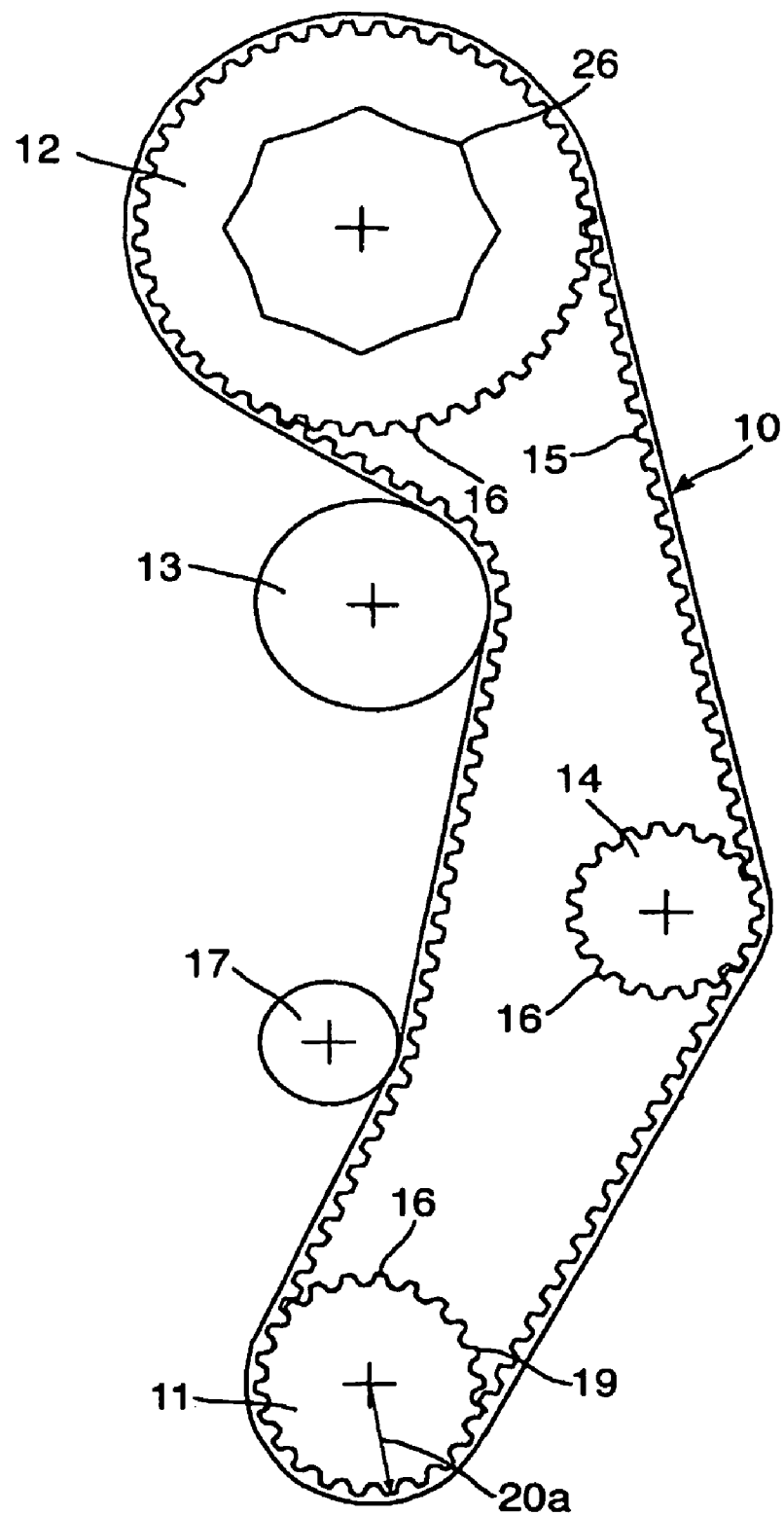
FIG. 7 is a schematic illustration of a synchronous drive apparatus for a motor vehicle internal combustion engine, incorporating a non-circular sprocket component embodying the invention.
Figure 8A:
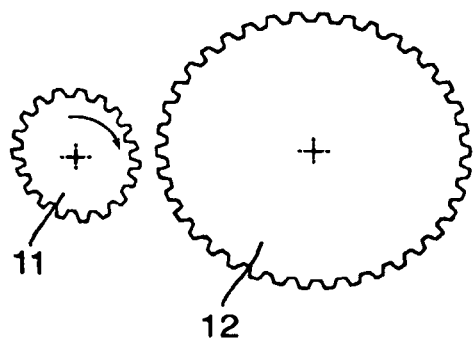
FIGS. 8a to 8d show different configurations of crankshaft and camshaft sprockets embodying the Invention in 4-cylinder and 3-cylinder engines.
Figure 8B:
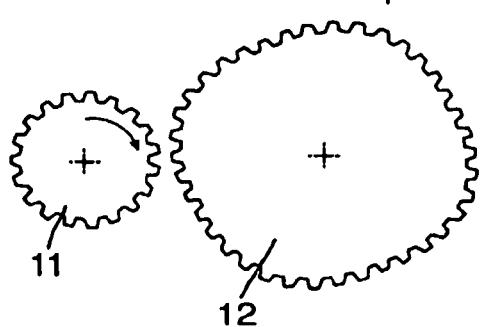
Figure 8C:
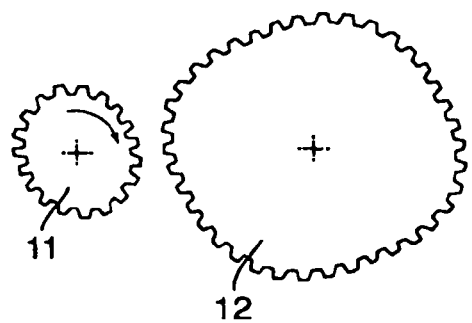
Figure 8D:
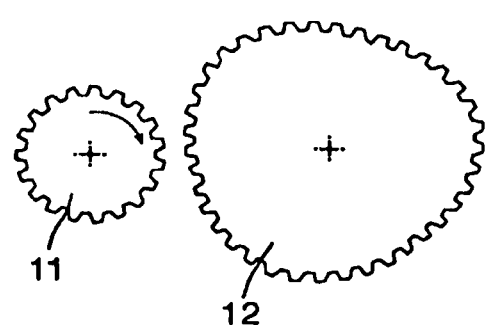
Figure 9A:
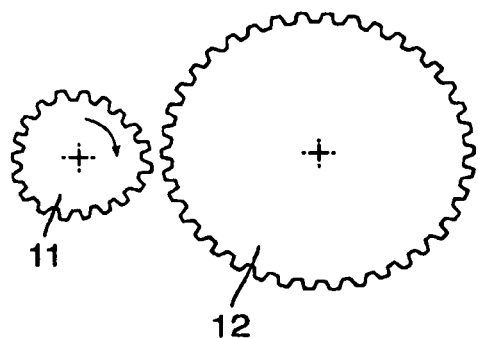
FIGS. 9a to 9d show different combinations of crankshaft and camshaft sprockets embodying the invention in 6-cylinder, 8-cylinder and 2-cylinder engines.
Figure 9B:
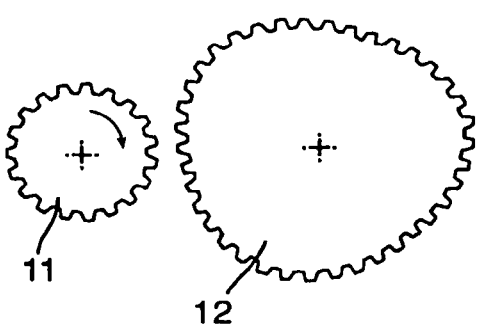
Figure 9C:
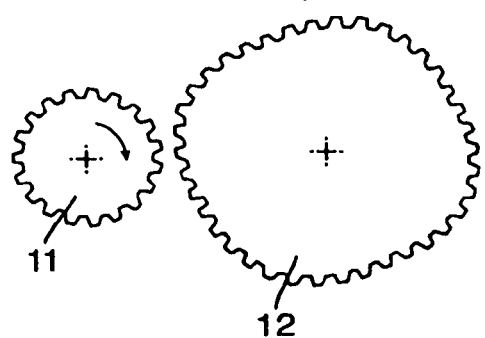
Figure 9D:
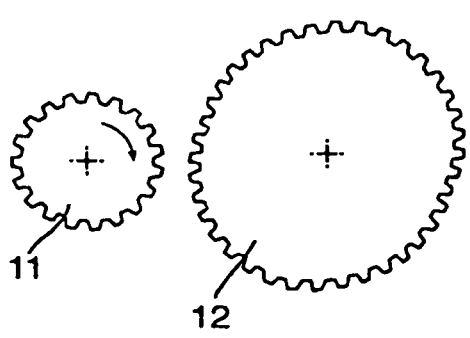

FIG. 7 is a diagrammatic representation of a synchronous drive apparatus for a motor vehicle internal combustion engine, embodying the invention. The apparatus comprises a continuous loop elongate drive structure 10, first and second rotors 11 and 12, and further rotors 13, 14 and 17. The continuous loop elongate drive structure 10 is provided by a conventional timing belt having teeth 15 together with intervening valleys which constitute a plurality of engaging sections of the continuous loop elongate drive structure. Each rotor 11 and 12 is provided by a sprocket having a plurality of teeth 16 for engaging the valleys between the teeth 15 of the timing belt 10. The sprocket 11 is coupled to the crankshaft (not shown) of an internal combustion engine, and the sprocket 12 is coupled to a rotary load assembly (not shown) which is constituted by a camshaft 26 of the internal combustion engine. The timing belt 10 is engaged about the first and second rotors 11 and 12, the first rotor 11 being arranged to drive the belt 10 and the second rotor 12 being arranged to be driven by the belt 10. The rotor 14 also has teeth 16 and consists of a sprocket for driving other elements of the internal combustion engine, such as a water pump, and the rotor 13 is preferably for a belt tensioner bearing on a non-toothed side of the timing belt 10, to tension the belt in known manner. Rotor 17 is preferably for a fixed idler pulley bearing on the non-toothed side of timing belt 10.

In a known form of a synchronous drive apparatus, the crankshaft sprocket would have a circular profile. In such a case, the synchronous drive apparatus is prone to vibrations, known as torsional vibrations, which arise from the opening and closing of the intake and exhaust valves of the internal combustion engine by the overhead camshaft.

In accordance with the embodiment of the present invention shown in FIG. 7 for a SOHC engine, the crankshaft sprocket 11 has a non-circular profile (as described previously) indicated generally by reference numeral 19. The non-circular profile 19 is, In the particular embodiment described, an oval having the major axis 20 and the minor axis 21 shown in FIG. 1. The profile 19 has the two protruding portions 22 and 23 and the two receding portions 24 and 25.

FIGS. 8a to 8d show different combinations of crankshaft and camshaft sprockets for 4-cylinder and 3-cylinder engines. FIGS. 9a to 9d show different combinations of crankshaft and camshaft sprockets for 6-cylinder, 8-cylinder and 2-cylinder engines. In each case, one or more of the sprocket components can be of a form embodying the present invention, generally as has been described hereinbefore.

There will now be described with reference to FIG. 4, an alternative embodiment of the invention, in which the non-circular profile of the sprocket component is generally oval, but also includes minor protruding portions positioned around the rotor. In FIG. 4, there is indicated the width of each valley as a constant width of 4.07 mm. The width of each tooth is shown to vary from a minimum of 4.18 mm at the midpoint V1, to a maximum of 4.62 mm at the midpoint V4, and back down to a lesser amount of 4.42 mm at V6. A similar pattern is repeated through the remaining three quarters of the rotor.

The non-circular profile shown in FIG. 4 is particularly useful when used In a synchronous drive apparatus for an internal combustion engine, such as is shown in FIG. 7. In addition to the two major protruding portions 22 and 23, there are provided two additional minor protruding portions 31 and 32, in the region of the midpoints V6 and V16. To achieve this, the midpoints V1 to V20 of the teeth are positioned on a non-circular polygon which differs from that shown in FIG. 2, and which is provided by a modified formula, modified from the formula for FIG. 2. The vertices V1 to V20 are provided on a non-circular polygon given by the formula:

$$R_n = L + B_2 \cos\left(2\pi \frac{n}{N} 2\right) + B_4 \cos\left(2\pi \frac{n}{N} 4 + \varphi\right)$$

where:
$R_n$=distance from an intersection $V_n$ to the centre A of the rotor,
n=the number of the intersection $V_n$, numbered from a reference intersection at n=1,
L=the average distance from an intersection $V_n$ to the centre A of the rotor,
$B_2$=a first desired out-of-round factor defined as the difference between the average distance L and the actual distance $R_n$ when taken either at the greatest value of $R_n$ at a major protruding portion or at the least value of $R_n$ at a major receding portion, the first out-of-round factor being such as to reduce or eliminate vibration arising from 2nd order harmonics of the rotary load assembly, $B_4$=a second out-of-round factor defined as the difference between the average distance L and the actual distance $R_n$ when taken either at the greatest value of $R_n$ at a minor protruding portion or at the least value of $R_n$ at a minor receding portion, the second out-of-round factor being such as to reduce or eliminate vibration arising from 4th order harmonics of the rotary load assembly, N=the number of teeth required on the rotor, and φ=an angle representing a desired phase shift between 2nd and 4th order vibrations.

The first formula given above with reference to FIGS. 1, 2 and 3 allows the construction of a noncircular sprocket that can reduce a main order of torsional vibrations. Many engines (for example Diesel engines) encounter higher orders (harmonics) also. A modified embodiment of the present invention allows the removing or reducing of multiple orders of torsional vibrations simultaneously. In this case the first formula given above takes a somewhat different form as shown in the second formula, given with reference to FIG. 4. For example to fight 2nd and 4th order vibrations simultaneously on a 4-cylinder inline engine, two out-of-round factors $B_1$ and $B_2$ need to be introduced. $B_2$ is a desired out-of-round factor for 2nd order vibrations and $B_4$ is a desired out-of-round factor for 4th order. The angle φ is a desired phase shift between 2nd for 4th order.

The angle φ is the phase difference between the harmonic orders as defined by the Fourier equations. In the second formula, in particular, it is the phase difference between the second order and the fourth order. This angle depends on engine characteristics. For example for gasoline engines it is usually small when compared to the Diesel engines.

The noncircular sprocket created using the second formula is mostly oval but also slightly square as is shown in FIG. 4. Removing or reducing multiple orders of torsional vibrations simultaneously is also possible by using more than one noncircular sprocket in the same drive. For example for a 4-cylinder inline engine making the camshaft sprocket square and the crankshaft sprocket also square will reduce 2nd and 4th order simultaneously.

Internal combustion engines come in many different configurations with varying cylinder count, single or double camshafts, with or without the fuel pump, etc. It is possible to apply modified formulas for a given configuration, based on the arrangements already described. It is, for example, widely known that a 4-cylinder engine generates predominantly second order vibrations. This means that one may choose the value of 2 for M (number of protruding portions of the rotor profile). In a case of a non-typical configuration the engine has to be tested and the engine vibration has to be measured in order to find an appropriate formula.

Referring again to FIG. 5, this illustrates the meaning of the out-of-round factor B. The distance from a point $V_1$ to the centre of the sprocket (point A) is given by:

$$R_1 = L + B$$

The distance from a point $V_6$ to the centre of the sprocket (point A) is given by:

$$R_6 = L + B$$

It is to be noted that the tooth at $V_1$ has a width of 4.35 mm (measured at the given depth) but the tooth at $V_5$ as a width of 4.5 mm.

FIG. 6 shows a regular round sprocket. In this sprocket all the distances from a point $V_n$ to the centre of the sprocket (point A) are equal, so that $$R_n = L$$

The tooth at $V_1$ has the same width of 4.45 mm as the tooth at $V_6$.

The invention claimed is:

1. A synchronous drive apparatus including a rotary component, the synchronous drive apparatus comprising:

a plurality of rotors comprising a first rotor and a second rotor, each of the plurality of rotors having a rotational axis and a plurality of teeth arranged about a perimeter;

a continuous loop drive structure having a plurality of engaging sections that are engaged with the teeth of the rotors to transmit rotary power through the continuous loop drive structure to drive the first rotor;

a rotary load assembly driven by the first rotor, the rotary load assembly generating a first periodic fluctuating torque when driven by the first rotor;

wherein at least one of the plurality of rotors is configured such that each of its plurality of teeth have a crown that is disposed between a pair of valleys, each of the valleys has a profile and each of the profiles is identical, and a distance between a midpoint of each of the crowns and the rotational axis of the at least one of the rotors varies around its perimeter to produce a non-circular rotor profile that is configured to produce a second periodic fluctuating torque that is out of phase with the first periodic fluctuating torque to reduce variation in a newt torque applied to the first rotor by the continuous loop drive structure and the rotary load assembly.

2. The synchronous drive apparatus of claim 1, wherein the at least one of the plurality of rotors comprises the second rotor.

3. The synchronous drive apparatus of claim 2, wherein the second rotor is arranged to drive the continuous loop drive structure.

4. The synchronous drive apparatus of claim 3, wherein the at least one of the plurality of rotors comprises the first rotor.

5. The synchronous drive apparatus of claim 2, wherein the at least one of the plurality of rotors comprises the first rotor.

6. The synchronous drive apparatus of claim 1, wherein the plurality of rotors comprises a third rotor, wherein the second rotor is arranged to drive the continuous loop drive structure and wherein the at least one of the plurality of rotors comprises the third rotor.

7. The synchronous drive apparatus of claim 6, wherein the third rotor is associated with an idler.

8. The synchronous drive apparatus of claim 1, wherein the rotary load assembly comprises at least one of a camshaft and a fuel pump.

9. The synchronous drive apparatus of claim 1, wherein the continuous loop drive structure comprises a toothed belt.

10. The synchronous drive apparatus of claim 1, wherein the continuous loop drive structure comprises a drive chain.

11. The synchronous drive apparatus of claim 1, wherein the midpoints of the crowns are positioned respectively at intersections of adjacent sides of a non-regular polygon with equal sides arranged in a non-circular configuration, the position of an intersection Vn of two adjacent sides being given by the formula $$Rn = L + B_2\cos\left(2\pi\frac{n}{N}2\right) + B_4\cos\left(2\pi\frac{n}{N}4\right) + \phi$$

where:

N=the quantity of teeth on the rotor;

n=an integer ranging between 1 and N identifying the number of the intersection Vn;

Rn=the distance from an intersection Vn to the center A of the rotor;

L=the average distance from an intersection Vn to the center of the rotor;

B2=a first desired out-of-round factor defined as the difference between the average distance L and the actual distance Rn when taken either at the greatest value of Rn at a major protruding portion or at the least value of Rn at a major receding portion, the first out-of-round factor being such as to reduce or eliminate vibration arising from second order harmonics of the rotary load assembly;

B4=a second desired out-of-round factor defined as the difference between the average distance L and the actual distance Rn when taken either at the greatest value of Rn at a major protruding portion or at the least value of Rn at a major receding portion, the second out-of-round factor being such as to reduce or eliminate vibration arising from fourth order harmonics of the rotary load assembly; and $\phi$=an angle representing a desired phase shift between second and fourth order vibrations.

* * * * *